Oct. 11, 1932.  G. F. ALWIN  1,882,353
CHICKEN FEEDER
Filed March 23, 1932  2 Sheets-Sheet 1
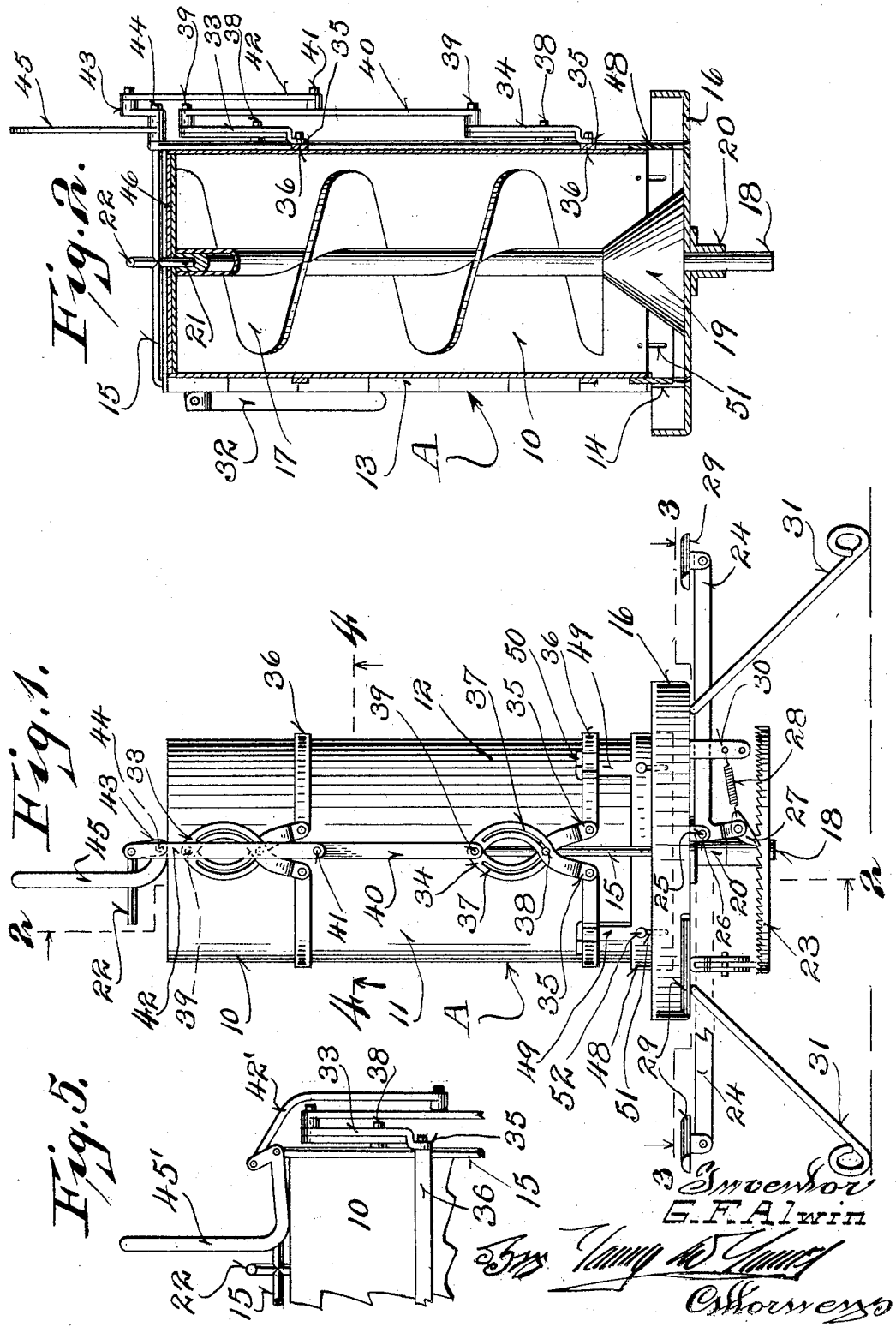

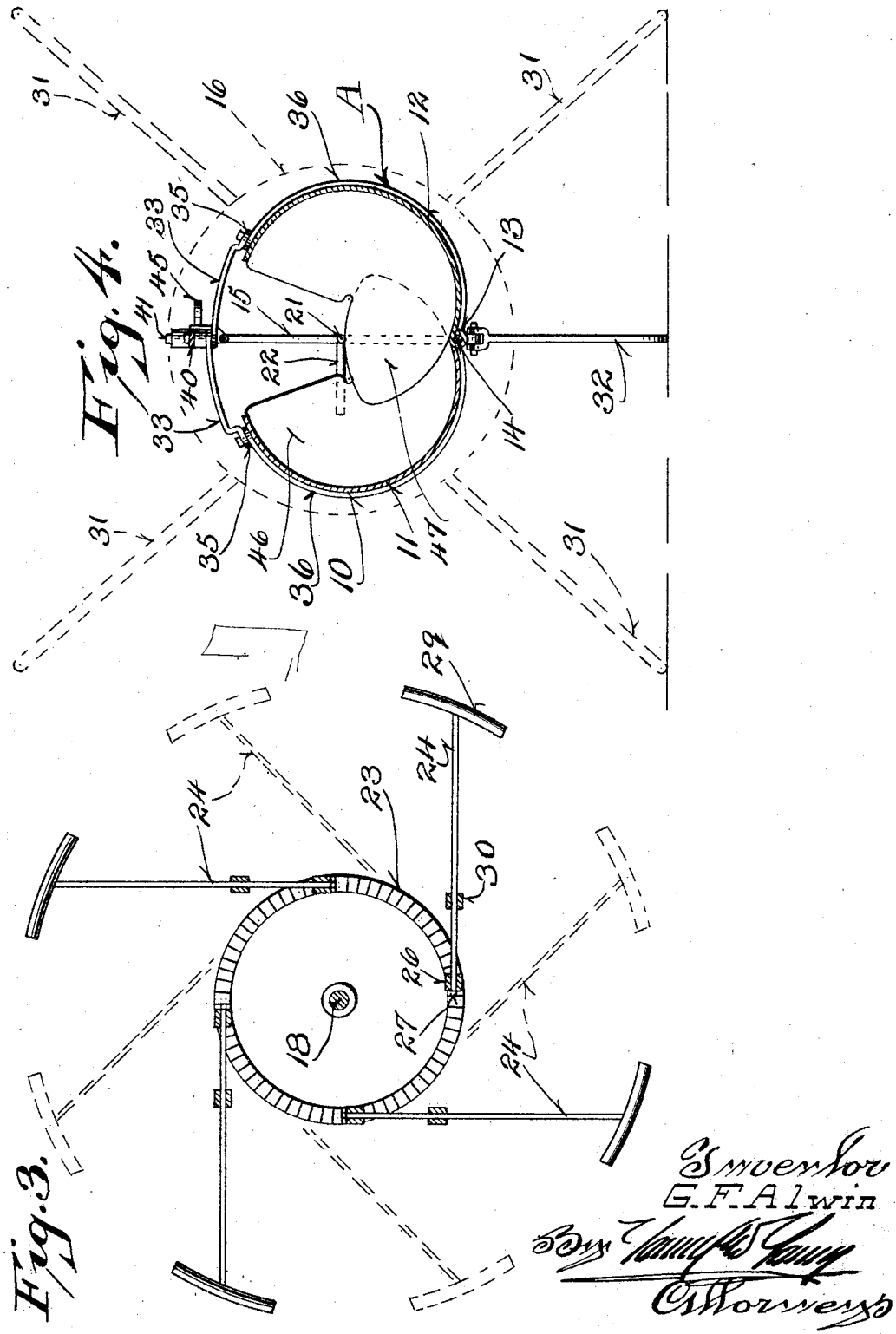

Patented Oct. 11, 1932

1,882,353

UNITED STATES PATENT OFFICE

GEORGE F. ALWIN, OF RIPON, WISCONSIN

CHICKEN FEEDER

Application filed March 23, 1932. Serial No. 600,638.

This invention appertains to poultry feeders and more particularly to a wet mash feeder for chickens.

One of the primary objects of my invention is the provision of a novel device for automatically distributing and supplying the feed to the feeding pan, so as to insure the proper delivery of the feed to the chickens as the same is used.

Another salient object of my invention is the provision of a wet mash feeder for chickens, in which the mash is automatically supplied to the feeding pan by the weight of the chickens as the same hop off and on the perches arranged around the pan.

A further important object of my invention is the provision of a wet mash feeder embodying a hopper for receiving the feed, with the feeding pan arranged below the hopper, the hopper having rotatably mounted therein, a feed screw for gradually feeding the mash to the pan, the screw having connected therewith an advancing ratchet wheel, with pivoted perches for the chickens, having means for operatively engaging the ratchet wheel, so that as the chickens rest upon the perches, the weight of the chickens will operate the perches and advance the ratchet wheel and feed screw.

A further object of my invention is the provision of novel means for controlling the flow of feed from the hopper to the feeding pan, whereby the amount of feed delivered to the pan can be initially governed.

A further object of my invention is the provision of novel means for forming the hopper, whereby the hopper can be readily opened and closed for permitting the effective and expeditious filling of the hopper with the wet mash.

A still further object of my invention is to provide an automatic wet feed mash for chickens of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 1 is a side elevation of my improved automatic wet mash feeder;

Figure 2 is a vertical section through the same, with parts omitted, taken substantially on the line 2—2 of Figure 1, looking in the direction of the arrows;

Figure 3 is a detailed horizontal section taken on the line 3—3 of Figure 1, looking in the direction of the arrows, illustrating the novel arrangement of the perches, only four perches being shown in full lines for the sake of simplicity; and, Figure 4 is a transverse section through the improved feeder taken substantially on the line 4—4 of Figure 1, looking in the direction of the arrows, showing the hopper in its open position and resting on its side for permitting the filling thereof.

Figure 5 illustrates a sectional elevation of a preferred form of the lever mechanism for actuating the companion sections.

Referring to the drawings in detail wherein similar reference characters designate corresponding parts throughout the several views, the letter A generally indicates my improved automatic wet mash feeder for chickens which comprises a hopper 10 for receiving the wet mash.

The hopper 10 is constructed in a novel manner and includes a pair of substantially companion semi-cylindrical sections 11 and 12. The meeting longitudinal edges of the sections 11 and 12 on one side are provided with mating hinge barrels 13. These hinge barrels 13 receive one leg 14 of an inverted U-shaped supporting frame 15. The leg 14 forms a pivot on which the sections 11 and 12 can swing. The extreme lower ends of the legs of the inverted U-shaped frame 15 are rigidly connected to the feeding pan 16. This construction is such that the feeding pan is held below the hopper and the lower end of the hopper is open to permit the flow of feed from the hopper into the feeding pan.

Arranged axially within the hopper 10 is a rotatable feed screw 17 and this feed screw is connected with an axially extending shaft 18. As shown, the feed screw or spiral 17 terminates slightly short of the lower end of the hopper, and directly below the feed screw on the shaft 18 is a conical feed distributor or funnel 19. This conical feed distributor functions to spread the feed toward the periphery of the feeding pan 16. The lower end of the shaft 18 is rotatably mounted in a suitable bearing 20 carried by the axial center of the feeding pan 16 and the upper end of the shaft is provided with a bearing opening for receiving a bearing pin 21 formed on the top connecting portion of the rigid inverted U-shaped frame 15.

It is to be noted at this point, that the frame 15 is provided with a rigid hand grip 22 which facilitates the handling of the device during the opening and closing of the hopper and the filling thereof.

Rigidly secured to the extreme lower end of the shaft 18 below the feeding pan 16 is a ratchet wheel 23. It is to be noted that the teeth of the ratchet wheel are disposed in upstanding annular relation to the body portion thereof. By the construction so far, it can be seen that upon rotation of the ratchet wheel, the feed screw 17 will be rotated for feeding the wet mash toward the lower end of the hopper and over the distributing cone 19 to the feeding pan.

As heretofore brought out, one of the salient features of my invention is the provision of means for automatically feeding the wet mash to the pan by the weight of the chickens. This means comprises a plurality of supporting and operating levers 24. These levers are arranged substantially tangential to the ratchet wheel 23. The levers 24 are of a bell crank construction and are rockably mounted at their angles on pivoted pins 25 carried by depending ears 26 secured to the lower face of the feeding pan 16. The inner short arms of the levers 24 pivotally carry dogs 27 which are adapted to engage the teeth of the ratchet wheel 23. These dogs are normally urged toward the teeth by means of contractile coil springs 28. These springs also function to hold the outer ends of the levers in a raised position. The extreme outer ends of the levers have pivotally connected thereto, the perches 29 on which the chickens are adapted to rest when the same are feeding from the pan 16.

I can provide as many of the levers 24 and perches 29 as may be desired. In the present illustration, I have only shown four of the perches and levers for the sake of simplicity, but have indicated the use of eight perches in dotted lines.

Considering that the hopper is filled with the feed and in a vertical position, the chickens hop upon the perches 29 and the weight of the chickens will rock the levers and move the ratchet wheel to rotate the feed screw 17. The wet mash will be fed downward and distributed by the cone 19 to the feed pan or trough 16, where the chickens can reach the same.

It is to be noted that the levers 24 are guided in their swinging movement by means of depending spaced ears or guide plates 30. These guide ears or plates 30 can be provided at spaced points with openings for the reception of suitable stops to control the swinging movement of the levers 24. It is to be also noted that the contractile coil springs 28 for the pivoted dogs 27 are also connected to said guide plates.

In order to support the hopper in a raised vertical position, I provide a plurality of base legs 31. These legs are secured to the feeding pan and flare outwardly and downwardly therefrom to define an enlarged supporting base.

When it is desired to fill the hopper with the wet mash, the same is laid over in a horizontal position, resting on two of the base legs 31 and on an auxiliary folding leg 32 carried by the hopper adjacent to its upper end. This auxiliary leg 32 is pivoted to the hopper, so that the same can either be swung parallel to the hopper or at right angles thereto.

After the hopper has been moved to a horizontal position, the same can be opened for the reception of the mash by swinging the companion sections 11 and 12 on the pivot leg 14 of the rigid frame 15 for the hopper. I provide novel means for opening and closing the hopper and for holding the sections of the hopper in their closed position against accidental opening movement. This means comprises upper and lower pairs of arcuate actuating levers 33 and 34. As shown, these levers are pivotally connected together adjacent to their upper ends by pivot pins 39 and their outer ends are arranged in overlapping relation and are pivotally connected as at 35 to the ends of semi-circular reinforcing bands 36 which are secured to the outer face of the sections of the hopper. The body portions of the arcuate pairs of levers 33 and 34 are provided with arcuate slots 37, in which are fitted guide pins 38. The pivot pins 39 utilized for connecting the arcuate levers together, pivotally support a connecting link 40, which is provided at a point intermediate its ends with an outstanding pivot pin 41. This pivot pin 41 receives the operating rod 42, the upper end of which is pivotally connected to an actuating crank 43. This crank 43 can be rotatably mounted on a stub shaft 44 secured to the rigid frame 15. The crank 44 can be operated by means of a hand lever 45 rigidly secured to the crank. Obviously, by rocking the crank 44, the operating link 42 will actuate the connecting link 40 longitudinally of the hopper, causing the levers of the pairs of levers 33 and 34 to open or close according to the direction of movement of the connecting link 40. This effectively brings about the opening and closing of the sections 11 and 12.

The upper end of each section of the hopper carries an end closure plate 46, and the closure plates carried by the sections are adapted to overlap when the sections are in their closed position. In this connection, it is to be noted that the closure plates 46 adjacent to the pivot 14 are provided with overlapping extensions 47 which function to retain the feed when the hopper is in its open position for receiving the same.

I can provide means for governing the flow of the feed or mash from the hopper into the feeding trough or pan 16. This means embodies an annular collar 48 slidably mounted on the lower end of the hopper. This collar is movable toward and away from the trough and carries upstanding guide arms 49 which are received under the lower semi-circular reinforcing bands 36. The outer ends of the arms 49 are provided with laterally extending ears 50 which engage over the top of the band. Obviously, the collar 48 is made in two semi-circular companion sections, so as not to hinder the opening and closing of the hopper. At spaced points, the collar is provided with guide slots 51 which receive the headed guide pins 52 carried by the hopper.

Figure 5 of the drawings shows my preferred fork of actuating mechanism for the foldable sections 11 and 12. The 40' is connected to a bell crank lever 45' by the rod 42.

From the foregoing description, it can be seen that I have provided an exceptionally simple and durable wet mash feeder for chickens in which the mash is automatically fed to the pan or feeding trough as the chickens hop on the perches.

Changes in details may be made without departing from the spirit or the scope of my invention, but what I claim as new is:

I claim:

1. A chicken feeding device comprising a hopper, a feed pan arranged below the hopper for receiving the feed therefrom, a feed screw rotatably mounted within the hopper, pivoted perches carried by the pan, and means operatively connecting the pivoted perches with the feed screw, whereby upon movement of the perches by the weight of the chickens the feed screw will be operated.

2. An automatic wet mash feeder for poultry comprising a hopper, a feed pan arranged below the hopper, a rotatable feed screw disposed within the hopper, a feed spreading cone arranged in the bottom end of the hopper below the feed screw, a plurality of perches arranged around the feed pan, and means operatively connecting the perches to the feed screw, whereby upon movement of the perches by the weight of the chickens the feed screw will be actuated.

3. An automatic wet mash poultry feeder comprising a hopper, a feed pan arranged below the hopper, a rotatable shaft arranged axially within the hopper, a feed screw connected with the shaft, a ratchet wheel secured to the lower end of the shaft below the feed pan, a plurality of levers pivotally connected to the lower end of the feed pan, pivoted dogs carried by the inner ends of the levers engaging the ratchet wheel, and perches connected with the outer ends of the levers.

4. An automatic wet mash feeder for poultry comprising a hopper, a feed pan arranged below the hopper, means for controlling the flow of feed of the hopper to the pan, an axially disposed shaft rotatably mounted within the hopper and extending below the feed pan, a feed screw rotatable with the shaft, a distributing cone arranged below the feed screw, a ratchet wheel secured to the shaft below the hopper, a plurality of bell crank-shaped levers rockably mounted at their angles to the lower face of the feed pan, pivoted dogs carried by the inner end of said levers engaging the ratchet wheel and pivoted perches connected with the outer ends of the levers, said perches being arranged beyond the feed pan.

5. A wet mash feeder for poultry comprising a hopper, a feed pan arranged below the hopper, an adjustable gate for controlling the flow of feed from the hopper to the pan, an axially disposed shaft rotatably mounted within the hopper and extending below the pan, a ratchet wheel secured to the lower end of the shaft, a plurality of bell crank shaped levers rockably mounted at their angles to the lower face of the feed pan, said levers extending substantially tangential to the periphery of the ratchet wheel, pivoted dogs secured to the inner ends of the levers engaging the ratchet wheel, pivoted perches connected with the outer ends of the levers, depending guide arms secured to the feeding pan for the levers, means carried by the guide arms for limiting the swinging movement of the levers and spring means connecting the dogs to the guide arms for normally holding the dogs in engagement with the ratchet wheel and the outer ends of the levers in a raised position.

6. In an automatic wet mash feeder for poultry, a hopper comprising a pair of companion sections pivotally connected together, a feeding pan disposed at one end of the hopper, supporting legs secured to the feeding pan for normally holding the hopper in a vertical position and an auxiliary leg secured to the end of the hopper remote from the feeding pan for cooperation with certain of the first mentioned legs for holding the hopper in a horizontal position during the filling thereof with the mash.

7. In an automatic wet mash feeder for poultry, a hopper comprising a pair of companion semi-circular sections pivotally connected together at one longitudinal edge, a feeding pan arranged at one end of the hopper, and means for opening and closing the sections to the hopper comprising pairs of pivotally connected arcuate arms arranged adjacent to the opposite ends of the hopper, means pivotally connecting the inner free ends of the arms upon opposite sections of the hopper, said arms being provided with arcuate slots, pins traveling in said slots, a connecting link pivotally connected at its opposite ends to said arms, a crank, an operating link pivotally connected to the crank and to the connecting link and an operating handle for the crank.

8. An automatic mash feeder for poultry comprising an inverted U-shaped frame, a feeding pan rigidly connected to the lower ends of the legs of the frame, a hopper including a pair of companion semi-circular sections pivotally mounted on side of one leg of the frame, a bearing secured to one end of the frame and extending into the hopper, a bearing connected to the axial center of the pan, a shaft journaled in the bearing carried by the pan and the bearing carried by the frame, a feed screw rotatable with the shaft, a distributing cone arranged below the feed screw, means for opening and closing the sections on their pivot, a ratchet wheel secured to shaft, and means for actuating the ratchet wheel including pivoted perches connected with the pan.

In testimony that I claim the foregoing I have hereunto set my hand at Ripon, in the county of Fond du Lac and State of Wisconsin.

GEORGE F. ALWIN.